United States Patent Office 3,502,544
Patented Mar. 24, 1970

3,502,544
PROCESS FOR PRODUCING L-ISOLEUCINE BY FERMENTATION
Zenjiro Sugisaki, Katsuji Yamamoto, and Hirokazu Koyama, Noda-shi, Japan, assignors to Noda Institute for Scientific Research, Chiba-ken, Japan
No Drawing. Filed Oct. 31, 1966, Ser. No. 590,532
Int. Cl. C12b 1/00; C12d 13/06
U.S. Cl. 195—29                                                6 Claims

ABSTRACT OF THE DISCLOSURE

Process for producing L-isoleucine which involves cultivating prototrophs of glutamic acid-producing bacteria, such as *Brevibacterium divaricatum*, under an aerobic condition in a medium containing a carbon source, a nitrogen source, inorganic salts, biotin and DL-alpha-amino-n-butyric acid, said cultivating medium not requiring any nutrients other than vitamins. The aforementioned process is characterized with respect to the ease of culturing, and also in the high producibility and high selectivity for producing the L-isoleucine.

---

This invention relates to a process for producing by fermentation L-isoleucine, a class of the nutritionary essential amino acids which is attracting attention as being an anti-anemic factor.

The process of producing L-isoleucine by fermentation was heretofore regarded as being of more advantage than the process of isolation from the hydrolyzates of protein or the synthetic process. And the processes which were employed were either the one wherein L-isoleucine was produced by cultivating the L-isoleucine-producing bacteria such as *Bacillus subtilis*, *Pseudomonas aeruginosa* and *Brevibacterium ammoniagenes*, in a medium consisting of at least a carbon source, a nitrogen source and an inorganic salt, to which had also been added alpha-aminobutyric acid, or the one in which L-isoleucine was produced by cultivating an L-isoleucine-producing bacteria such as *Serratia marcescens* and *Pseudomonas fluorescens*, in a medium wherein D-threonine has been used instead of alpha-aminobutyric acid in the hereinabove-described medium.

Further, as other L-isoleucine-producing bacteria which are cultivated in a medium in which alpha-aminobutyric acid is a requisite, known are such, for examples, as *Serratia marcescens*, *Errivinia carotovora*, *Aerobacter aerogenes*, *Pseudomonas aureofaciens* and bacteria belonging to the genus *Escherichia*, *Micrococcus* or *Sartina*. Recently, it has been reported that nutrient requiring mutants, and particularly biochemical mutants derived from *Micrococcus glutamicus* and requiring amino acids, i.e., auxotrophs of *Micrococcus glutamicus*, produce amino acids corresponding to the amino acids they require. For instance, it has been reported that L-isoleucine was produced by cultivating L-leucine requiring mutants derived from *Micrococcus glutamicus*, in a medium containing alpha-aminobutyric acid [Journal of General and Applied Microbiology, vol. 7, No. 1, p. 41 (1961)].

In addition, there is also a report that L-isoleucine has been produced by cultivating in a medium containing alpha-aminobutyric acid *Brevibacterium ammoniagenes*, *Paracolobactrum aerogenoides*, and *Escherchia freundii* or *Escherichia coli*, which are known as being valine-producing bacteria. Further, it is also reported that L-isoleucine has been produced by cultivating in a similar medium *Pseudomonas ovalis*, *Achromobacter pentosus* or *Streptomyces flaveorus*.

We found that bacteria differing from these heretofore-known L-isoleucine-producing bacteria, particularly the glutamic acid-producing bacteria which does not require as nutrient others besides vitamins, i.e., prototrophs of glutamic acid-producing bacteria, demonstrate an excellent L-isoleucine-producing capacity when cultivated in a medium containing at least a carbon source, a nitrogen source, an inorganic salt, biotin as the vitamin and, in addition, DL-alpha-amino-n-butyric acid as the annex.

Further, it is regarded that, in order to produce L-isoleucine utilizing the bacteria belonging to the aforesaid *Micrococcus glutamicus*, those bacteria must be biochemical auxotrophs which require amino acids besides vitamins. To isolate bacterial having such a character directly from nature would require a tremendous amount of time and labor and would also be a very difficult matter. In fact, neither does the aforesaid literature make any disclosures as to the direct isolation of the bacteria, the mutants of *Micrococcus glutamicus* used being obtained by means of the conventional procedures for obtaining mutants, for example, by irradiation with ultraviolet rays, X-rays or gamma rays.

We found that it was possible to produce L-isoleucine selectively and to advantage by using glutamic acid-producing bacteria having no requirement for nutrients other than vitamins, i.e., prototrophs of glutamic acid-producing bacteria, and without the necessity, as hereinabove, described, of collecting the difficulty isolated bacteria or preparing the microbial auxotrophs such as the artificially derived from biochemical mutants.

In the hereinbefore-described L-isoleucine fermentations which use a medium containing alpha-aminobutyric acid, the producing mechanism is of the valine fermentation→L-isoleucine fermentation conversion type, and it was held heretofore that the alpha-aminobutyric acid functions as a metabolic controller with only a part thereof being taken into the L-isoleucine structure as a $C_4$-precursor during only the early stage of the fermentation, the remainder functioning only as said metabolic controller, and the production of isoleucine was carried out with the glucose in the medium becoming the $C_4$-precursor. [Symposium on Amino Acids Fermentation 2, 97 (1960); 3, 101 (1961); and 6, 129 (1962)].

According to our researches, it was found that the production of L-isoleucine in accordance with this invention in a medium consisting of a carbon source, a nitrogen source, inorganic salts, biotin as the vitamin and, in addition, alpha-aminobutyric acid, using prototrophs of glutamic acid-producing bacteria, was carried out in accordance with a new type of conversion, i.e., glutamic acid fermentation→L-isoleucine fermentation conversion, wherein the alpha-aminobutyric acid function as a $C_4$-precursor continually throughout the whole period of fermentation. Hence, this process is distinguishable from the prior art in respect of its L-isoleucine producing mechanism also.

According to the process of this invention, L-isoleucine can be selectively produced in good yield and commercially to advantage by carrying out the new glutamic acid fermentation→L-isoleucine fermentation conversion by customary fermentation procedures utilizing, as such, the known bacteria (prototrophs) which are used in producing glutamic acid, without the necessity of searching and collecting from nature bacteria having the leucine requirement, a task requiring tremendous time and labor, or the necessity of preparing mutants having such a requirement.

It is therefore an object of this invention to provide a process for producing L-isoleucine by means of the fermentation process, wherein L-isoleucine can be produced and collected commercially to advantage in accordance with a new producing mechanism which uses known bacteria, particularly the prototrophs of glutamic acid-producing bacteria which do not have, other than the requirement for biotin, a requirement for amino acids such as leucine.

The fact that may typical glutamic acid-producing bacteria produce L-isoleucine in a medium containing alpha-aminobutyric acid, according to the aforesaid new conversion mechanism, has been reported by some of us in the Collection of Abstracts of Lectures of the Annual Meeting of the Society of Fermentation Technology, p. 45, Japan (1965) published Nov. 4, 1965. This invention is based on this lecture report, which is more fully described herein.

In this invention, use is made of the usually known prototrophs of glutamic acid-producing bacteria, which do not have, other than their requirement for biotin, a requirement for amino acids, such as leucine.

As such bacteria, known bacteria such as presented below are included.

(A) Prototrophs of glutamic acid-producing bacteria belonging to the genus Brevibacterium:

|  | Deposit |
|---|---|
| Brev. divaricatum | NRRL 2311, NRRL 2312. |
| Brev. pentoso-amino-acidicum. | |
| Brev. kawasaki. | |
| Brev. glutamicum. | |
| Brev. lactofermentum | ATCC 13869. |
| Brev. obihiri. | |
| Brev. saccharolyticum | ATCC 14066. |
| Brev. immariophorum | ATCC 14068. |
| Brev. aquapile. | |
| Brev. flavum | ATCC 13826, ATCC 14067. |
| Brev. roseum | ATCC 13825. |
| Brev. No. 32180. | |
| Brev. niigata. | |

These are all known bacteria and are regarded as belonging to the genus Brevibacterium disclosed at page 490 of Bergey's Manual of Determinative Bacteriology 7th ed. (1957) [hereinafter abbreviated to Bergey's Manual].

Prototrophs of glutamic acid-producing bacteria belonging to the genus Corynebacterium:

| Cory. acetoacidophilum | ATCC 13870 |
|---|---|
| Cory. lilium | NRRL–B–2243 |
| Cory. callunae | NRRL–B–2244 |
| Cory. No. 1633A. | |

These known bacteria are regarded as belonging to the genus Corynebacterium disclosed at page 579 of Bergey's Manual.

(C) Prototrophs of glutamic acid-producing bacteria belonging to the genus Microbacterium:

| M. flavum var glutamicum | ATTC 13693 |
|---|---|
| M. salicinovorum nov. sp. | |
| M. ammoniaphilum | |

These known bacteria are regarded as belonging to the genus Microbacterium disclosed at page 600 of Bergey's Manual.

(D) Prototrophs of glutamic acid-producing bacteria belonging to the genus Arthrobacter: *A. globiformis, A. simplex, A. pascens,* and *A. oxydans.*

These known bacteria are regarded as belonging to the genus Arthrobacter disclosed at page 605 of Bergey's Manual.

(E) Other known prototrophs of glutamic acid-producing bacteria: *Coryne-form bacterium* No. 129G.

Since the microbiological characters of the species of these known bacteria are well-known and a description thereof would merely become prolix, it will be omitted.

In any event, wide use of the prototrophs of glumatic acid-producing bacteria can be made in this invention.

Although these bacteria demonstrate an activity in common with respect to the point that they bring about the glutamic acid fermentation→L-isoleucine fermentation conversion type of fermentation, in consideration of the various points such as the ease of culture, high producibility and high degree of selectivity of producing L-isoleucine, preferred are the known prototrophs selected from the group consisting of *Brevibacterium divaricatum, Brevibacterium pentoso-amino-acidicum, Brevibacterium niigata, Corynebacterium lilium, Corynebacterium callunae, Microbacterium flavum yar glutamicum, Microbacterium salicinovorum* nov. sp., *Arthrobacter globiformis, Arthrobacter simplex* and *Arthrobacter oxydans.*

The medium to be used for the culture can be either a synthetic or natural medium so long as it is one which contains at least a carbon source, nitrogen source, an inorganic salt, biotin and alpha-aminobutyric acid, which can be utilized by the bacteria employed. The carbon source include the monosaccharides such as glucose, fructose, mannose and galactose and such as glycerol and xylose, in addition, the oligosaccharides, as well as starch, amylolysed starch, molasses and other carbohydrates. Further, the organic acids such as malic, fumaric, lactic, succinic, acetic and citric acids can also be used.

The nitrogen source include ammonia, the inorganic or organic ammonium salts such as ammonium sulfate, ammonium chloride, ammonium nitrate, ammonium phosphate, ammonium carbonate and ammonium acetate, nitrates, urea and other nitrogen-containing compounds as well as peptone, meat extract, yeast extract, corn-steep liquor, case in hydrolysate, fish meal or digested material thereof, defated soybeans cake or digested material thereof, meat extract of silkworm pupa and hydrolysates of other protein materials.

In practicing the invention process, urea or a combination of urea and other nitrogen sources is preferred as the nitrogen source. The amount used of the urea in this case should be 0.5–5 grams, and preferably 1.5–2.5 grams, per 100 cc. of the medium.

On the other hand, as the inorganic salt can be mentioned the potassium phosphates, such as potassium dihydrogen phosphate ($KH_2PO_4$) and potassium monohydrogen phosphate ($KHPO_4$), magnesium sulfate, ferrous sulfate, manganese sulfate, copper sulfate and sodium molybdate ($Na_2MoO_4$). The use of the inorganic salt in a minute amount will suffice. In practicing the invention process, the presence in the medium of a combination consisting of 2–6 p.p.m. of copper sulfate, 5–40 p.p.m. of ferrous sulfate, 5–20 p.p.m. of manganese sulfate, 500–2000 p.p.m. of potassium phosphates and 200–500 p.p.m. of magnesium sulfate is particularly preferred.

Needless to say, use may be made of the carbon source, nitrogen source and inorganic salt, suitably combined using a plurality of each thereof.

As previously stated, for using the glutamic acid-producing bacteria, biotin, which is one class of vitamin, is added to the medium according to the invention process. Although the amount added of the biotin is suitably varied according to such as the strain of bacteria used, the cultivation temperature and pH of the culture medium, the amount usually used is on the order of 4–50 gammas, and preferably on the order of 10–30 gammas, per liter of the medium. If the amount of biotin is insufficient, glutamic acid is produced as a by-product.

Of those materials which were mentioned as a nitrogen source, for example, corn-steep liquor and the meat extract of silkworm pupa are biotin-containing materials, and hence these nitrogen sources can be substituted for a part or whole of the biotin. It is to be understood that such a mode is comprehended by the present invention as a matter of course.

According to our researches, in the previously described new fermentation mechanism for producing L-isoleucine by using the prototrophs of glutamic acid-producing bacteria the concentration in the medium of the biotin is not too much of a controlling factor in carrying out the fermentation for producing L-isoleucine. This fact is one of the remarkable differences between the above-mentioned L-isoleucine fermentation and the well known glutamic acid fermentation which occurs only under the suboptimal concentration of biotin, a critical controlling factor in carrying out the fermentation. Incidentally, it is preferable to add thiamine, another vitamin, besides biotin.

In this invention, by further adding alpha-aminobutyric acid to the hereinbefore-described medium, a pronounced conversion of the fermentation mode from glutamic acid fermentation to L-isoleucine fermentation takes place, and with the alpha-aminobutyric acid functioning continually throughout this fermentation run as a $C_4$-precursor, L-isoleucine is produced readily and conveniently.

An explanation in detail of the fermentation mechanism would merely make the description prolix. Hence, it will be omitted but, for example, if a basal medium (BM) consisting of the following materials on a weight percent basis per 100 cc. of the medium, i.e., 9% glucose, 2% urea, 0.04% $KH_2PO_4$, 0.08% $K_2HPO_4$, 0.025% $MgSO_4 \cdot 7H_2O$, 0.001% $FeSO_4 \cdot 7H_2O$ and 0.001% $MnSO_4$, is used and a P-medium is prepared by adding thereto 0.5% of corn-steep liquor corresponding to a content of suboptimal amount of biotin and thiamin, and RA-medium is prepared by adding thereto 1.5% of said liquor corresponding to a content of a sufficient amount of biotin and, thiamine and 2% of alpha-aminobutyric acid. Thereafter the culture of *Arthrobacter globiformis* is carried out under identical conditions using the P- and RA-media, a glutamic acid fermentation takes place in which a great amount of glutamic acid (40–50% based on the weight of the total glucose in the medium) is formed as usual in the case when the P-medium is used, whereas in the case of the culture wherein the same bacteria are used in the RA-medium according to the invention process, surprisingly an L-isoleucine fermentation takes place to a pronounced extent that the amount produced of L-isoleucine reaches as much as 20 mg. per milliliter of the medium.

In the medium used in this invention, the amount used of the alpha-aminobutyric acid is on the order ranging between 5 and 30 grams per liter of the medium, and usually between 10 and 20 grams. When a monosaccharide, say, glucose is used as the carbon source, a combination consisting of 5–15 grams of glucose and 0.5–3 grams of alpha-aminobutyric acid per 100 cc. of the medium is desirable.

Particularly preferred combinations are those in which are used, per 100 cc. of the medium, 1 gram of the alpha-aminobutyric acid to 7.2–7.5 grams of a monosaccharide, say, glucose or 1.5 grams of the alpha-aminobutyric acid to 8–8.5 grams of the glucose or 2 grams of the alpha-aminobutyric acid to 9–10 grams of the glucose.

While the alpha-aminobutyric acid may be added to the medium in advance, a preferred procedure is to add it after the start of the cultivation, and especially during the early stages of the culture, for example, after 4–8 hours have elapsed after inoculation of the bacteria and starting of the aeration. The total amount to be added may be added at once at the beginning or the total amount can be portioned and added incrementally as the culture progresses.

That according to the invention process the alpha-aminobutyric acid not functioning as a metabolic controller but essentially as only a $C_4$-precursor would cause a new process of biological synthesis of the glutamic acid fermentation →L-isoleucine fermentation conversion type to take place was entirely unexpected heretofore.

According to this invention, the cultivation of a certain strain of the prototrophs of glutamic acid-producing bacteria in a medium containing a carbon source, a nitrogen source, inorganic salts, biotin and alpha-aminobutyric acid, as hereinbefore described, must be carried out under aerobic conditions such as by means of shake culture or submerged culture. The incubation temperature is varied somewhat depending upon the class of bacteria used, the composition of the medium and period of culture but is usually on the order of 25–35° C., and preferably 30±2° C. The pH of the culture is likewise varied somewhat but is usually on the order of 6–9, and preferably 6.5–8.5, a pH of neutrality to weak basicity on the order of 7–8 being especially preferred. In case the pH value tends to decline towards the acid side during the cultivation, it can be adjusted by adding a suitable amount of urea or ammonia solution usually, but if desired, calcium hydroxide, calcium carbonate, potassium hydroxide, sodium hydroxide or ammonium carbonate may also be added. The period of culture is usually on the order of 30–96 hours, but there is a difference in this time depending upon the mode of culture. For instance, in the case of tank culture, a very short period usually on the order of 30–50 hours will suffice.

After completion of the culture, the intended L-isoleucine can be collected by similar procedures as were used in the case of the conventional L-isoleucine fermentation. Usually the intended product can be collected by a procedure consisting of removing the cell paste by such means as filtration or centrifugal separation, utilizing the concentration method, or adsorbing the L-isoleucine employing the ion exchange resin method, say, a strongly acidic ion exchange resin, followed by elution, then concentrating the eluted solution and thereafter cooling it or adding an excess of hot alcohol while heating to precipitate the L-isoleucine. If necessary, the so obtained L-isoleucine can be purified by further application of the recrystallization method.

According to the invention process, the glutamic acid fermentation →L-isoleucine fermentation conversion type of culture using the heretofore-known prototrophs of glutamic acid-producing bacteria can be carried out to advantage commercially using alpha-aminobutyric acid as the $C_4$-precursor.

The modes of practicing the invention process will be further illustrated by means of the following examples. It is to be understood however that these examples are not in limitation of the invention process, but that the process can be modified by the various customary procedures known in the fermentation art without departing from the spirit of this invention.

EXAMPLE 1

2–3 loopfuls of bacterial cells of *Arthrobacter globiformis* grown on a bouillon agar slant were transferred into a sterile medium (50 ml. contained in a 500-ml. shake flask) whose composition on a basis of one liter of the medium was 50 grams of glucose, 5 grams of urea, 0.4 gram of $KH_2PO_4$, 0.8 gram of $K_2HPO_4$, 0.25 gram of $MgSO_4 \cdot 7H_2O$, 10 milligrams of $FeSO_4 \cdot 7H_2O$, 10 milligrams of $MnSO_4 \cdot 5H_2O$, 15 gammas of biotin and 500 gammas of thiamine HCl, following which shake culture (reciprocative shaking at 140 r.p.m. and a shake amplitude of 7 cm.) was carried out for 20 hours at 30° C. to prepare an inocula, 2 milliliter [an amount corresponding to 5% (vol. by vol.)] of which were then transferred into the following fermentation medium.

The composition of the fermentation medium, on a basis of one liter thereof, was 90 grams of glucose, 20 grams of urea, 0.3 gram of $KH_2PO_4$, 0.6 gram of $K_2HPO_4$, 0.25 gram of $MgSO_4 \cdot 7H_2O$ and 15 grams of corn-steep liquor. This medium was poured into a 500-ml. flask in increments of 40 ml. each and was used in the culture after autoclaving for 10 minutes at 120° C. DL-alpha-amino-n-butyric acid, which was prepared into a 20% (wt./v.) solution, was separately subjected to high pressure steam sterilization.

Thus, the culture was begun under aerobic conditions (similar to that in the case of the seed culture). Five hours later, 4 milliliters of the separately sterilized 20% DL-alpha-amino-n-butyric acid were added to the medium.

Since the pH of the medium fell to 7.2 after a culture of 46 hours, a sterile 20% (wt./v.) urea solution was added to the medium in an amount corresponding to 1/40 (v./v.) thereof, thereby accomplishing simultaneously the replenishment of the nitrogen source as well as the adjustment of the pH.

During the progress of the fermentation, sampling was carried out at prescribed intervals to follow up the state of L-isoleucine production. The results were as shown in Table I, below.

TABLE I

| Incubation time (hours) | pH of the medium | Growth of microbes (as turbidity [1]) | Consumed DL-αAB [2] | Production of L-isoleucine [2] |
|---|---|---|---|---|
| 0 | 8.2 | | | |
| 24 | 8.0 | 0.108 | 2.13 | 2.64 |
| 48 | 7.6 | 0.301 | 6.6 | 8.96 |
| 72 | 8.0 | 0.373 | 15.1 | 18.09 |
| 96 | 8.0 | 0.367 | 18.8 | 19.34 |

[1] Turbidity: Indicated by the optical density at 660 m$\mu$ when the fermentation fluid is diluted 20 fold with $10^{-2}$ M potasssium-phosphate buffer (pH 7.0).
[2] Unit: Milligram per milliliter of the fermentation broth.

After completion of the fermentation, one liter of the broth was centrifuged to separate therefrom the cell paste, after which the pH of the supernatant was adjusted to 2 with concentrated HCl, and thereafter the supernatant was treated with active carbon while being heated to obtain a decolorized filtrate. This filtrate was absorbed by being passed through a column packed with a strongly acidic cation exchange resin (e.g., Dowex 50–X8, Amberlite GC–120, Dia-ion SK#1, etc., all of which are of H-form), then eluted with a dilute ammonium solution followed by separation of the isoleucine fraction, which was concentrated under reduced pressure to a sirupy consistency (the ammonia being driven off at the same time), after which it was cooled to obtain 18.3 grams of crude crystals of isoleucine. By repeatedly recrystallizing this from hot water and hot alcohol, 14.2 grams of L-isoleucine crystals were obtained.

When these crystals were purified further by recrystallizing by the usual method and the properties of the so obtained L-isoleucine crystals were studied, they were in complete agreement with the authentics, as indicated below.

(i) Crystal form.—Thin hexagonal sheet form (those recrystallized from water-alcohol).
(ii) M.P.: 282–283° C. (in a sealed tube).
(iii) $[\alpha]_D^{20}$: +40.2° (3 gram in 100 ml. of 6NHCl, 25° C.).
(iv) M.P. of picrolonate.—Gradually turns brown from the neighborhood of 120° and melts at 178° C.
(v) M.P. of acetyl derivatives [1]: 149–150° C.

A decline was not observed in the melting points of (ii), (iv) and (v) when mixed and melted with the authentics.

(vi) The growth promoting effect of *Lactobacillus mesenteroides* was in complete agreement with the authentic L-isoleucine (examination by means of the microbioassay method).

(vii) The infrared absorption spectrum was in agreement with that of the authentics.

Further, in performing the aforesaid collection of the crystals, if one liter of the filtrate which had received the decolorizing treatment was in its as-obtained state concentrated to a sirupy consistency and then hot alcohol is added while the filtrate was hot, 26.2 grams of a white precipitate containing isoleucine in abundance were obtained.

EXAMPLE 2

Except that 1% (wt./v.) of meat extract of silkworm pupa plus 0.5% (wt./v.) of polypeptone was used instead of the corn-steep liquor of the medium in Example 1 and 4 ml. of 10% (wt./v.) DL-alpha-amino-n-butyric acid were added, the fermentation was otherwise carried out under identical conditions as in Example 1. The formation of L-isoleucine after 86 hours of fermentation was 17.8 mg./ml.

EXAMPLE 3

DL-alpha-amino-n-butyric acid was added in concentrations indicated in Table II, below, to a basic medium whose composition per 100 ml. thereof was 8 grams of glucose, 1.8 grams of urea, 0.04 gram of $KH_2PO_4$, 0.08 gram of $K_2HPO_4$, and 0.025 gram of $MgSO_4 \cdot 7H_2O$. When the organic nitrogen sources were varied as to sort and concentration, the results obtained were as shown in Table II. The inocula was identical with that of Example 1 and incubation time was about 72 hours.

TABLE II.—PRODUCTION OF L-ISOLEUCINE IN CERTAIN MEDIA CONTAINING DIFFERENT ORGANIC NITROGEN SOURCES

| | Concentration of DL-amino-n-butyric acid | | | |
|---|---|---|---|---|
| | 1% | | 1.5% | |
| | Concentration of Organic-N-Source | | | |
| Sort of Organic Nitrogen Source | 0.5% | 1.0% | 1.0% | 1.5 |
| Meat extract of silkworm pupa, milligrams | [1] 5.30 | [1] 6.2 | (¹) | (¹) |
| Corn-steep liquor, milligrams | 4.86 | 9.85 | 11.3 | 13.7 |
| Yeast extract | 1.44 | 1.44 | | |
| Ehrlich's meat extract | 1.06 | 1.52 | | |
| Polypeptone | 0.48 | 0.78 | | |
| 1% meat extract of silkworm pupa plus 0.5% polypeptone | 5.2 | 7.8 | 9.4 | 15.4 |

[1] Amount of L-isoleucine produced is indicated in milligrams of L-isoleucine per milliliter of the cultured filtrate.

The percentage indicated above represent the weight percent of the organic nitrogen source and DL-alpha-aminobutyric acid contained per 100 ml. of the medium.

EXAMPLE 4

To basic media containing per 100 ml. thereof 1.8 grams of urea, 0.03 gram of $KH_2PO_4$, 0.06 gram of $K_2HPO_4$, 0.025 gram of $MgSO_4 \cdot 7H_2O$, 3 gammas of biotin, 50 gammas of thiamin. HCl, 10 p.p.m. of $FeSO_4 \cdot 7H_2O$ and 10 p.p.m. of $MnSO_4 \cdot 5H_2O$ were added respectively 1 gram and 1.5 grams, per 100 ml. of the media, of DL-alpha-amino-n-butyric acid, the media being designated medium A and medium B, respectively. When the concentration of the glucose was varied as indicated in Table III, below, the formation of isoleucine was as shown therein. The inocula was identical to that used in Example 1, but the incubation was carried out for 68 hours at 30° C. by pouring 5 ml. of the media into separate large size test tubes (D=23 mm., L=20 cm.), transferring the aforesaid inocula after high pressure steam sterilization, into the tubes in an amount of 0.5 ml. per tube and thereafter shaking with a reciprocal test tube shaking apparatus (350 r.p.m., 2 cm. of amplitude).

[1] The method of preparing the derivatives is described in the following literatures: Journal of American Chemical Society, 73, 3359 (1951); and Journal of Biological Chemistry, 194, 455 (1952).

TABLE III.—ISOLEUCINE FORMATION
(MG./ML. OF BROTH)

| Glucose Concentration, percent: | Media A | Media B |
|---|---|---|
| 1.8 | 1.6 | 2.2 |
| 3.6 | 3.8 | 3.4 |
| 5.4 | 4.9 | 5.2 |
| 7.2 | 5.5 | 6.6 |
| 8.1 | 5.3 | 7.3 |
| 9.0 | 5.0 | 6.5 |
| 10.8 | 4.2 | 4.4 |

When modifications were made in the medium A by the addition, as shown in Table IV, below, of trace amount of the metallic ions a considerable difference in the yield was noted. (The other conditions were the same.)

TABLE IV

| Ions with which $Fe^{++}$ and $Mn^{++}$ in medium were modified: | Amount of isoleucine formed mg. per ml. of broth |
|---|---|
| Fe (10) Mn (10) | 5.46 |
| Fe (10)—Cu (2) | 7.50 |
| Fe (10) Mn (10) Cu (2) | 8.02 |
| Fe (10) Mn (10) Cu (2) Mo (10) | 7.38 |
| Fe 10)—Cu (2) Mo (10) | 6.79 |

Herein, glucose concentrations in the media employed were 7.29%, and the metallic ions were added here as sulfate salts, and the number in the parentheses indicate p.p.m.

In a complete synthetic medium, a very trace amount of cupric ion besides the $Fe^{++}$ and $Mn^{++}$ ions brings about a pronounced effect on the production of L-isoleucine.

EXAMPLE 5

When the bacterial strains capable of production of glutamic acid, as are shown in Table V, below, were grown under aerobic conditions in a sterile seed medium whose composition per 100 ml. thereof was 5 grams of glucose, 0.5 gram of urea, 0.04 gram of $KH_2PO_4$, 0.08 gram of $K_2HPO_4$, 0.025 gram of $MgSO_4 \cdot 7H_2O$, 10 p.p.m. of $FeSO_4 \cdot 7H_2O$, 10 p.p.m. of $MnSO_4 \cdot 5H_2O$ and 0.8 gram of corn-steep liquor, after which the seed bacteria were cultivated in the two classes of the following fermentation media A and B, the maximum yields were as shown in Table V. The incubation time varied depending upon the sort of bacterial strain, the results being those obtained after a cultivation of 48–96 hours. In carrying out the experiment, the procedures described in Example 1 were followed.

Medium A 8.1 grams of glucose, 2 grams of urea, 0.03 gram of $KH_2PO_4$, 0.06 gram of $K_2HPO_4$, 0.025 gram of $MgSO_4 \cdot 7H_2O$ 1.5 grams of corn-steep liquor and 1.5 grams of DL-alpha-amino-n-butyric acid, in a total volume of 100 ml.

Medium B 7.2 grams of glucose, 1 gram of meat extract of silkworm pupa plus 0.5 grams of polypeptone instead of 1.5 gram of corn-steep liquor in medium A, and 1 gram of DL-alpha-amino-n-butyric acid, the other components being the same as in medium A.

TABLE V

| | Production of L-isoleucine (mg. per ml. of fermentation broth) | |
|---|---|---|
| Bacterial strains | Medium-A | Medium-B |
| Brevibacterium divaricatum NRRL-2311 | 14.2 | 10.5 |
| Brev. pentoso-amino-acidicum | 11.8 | 8.4 |
| Brev. niigata | 13.1 | 9.2 |
| Corynebacterium lilium NRRL-B-2243 | 9.4 | 6.9 |
| Cory. callunae NRRL-B-2244 | 10.5 | 7.8 |
| Microbacterium salicinovorum nov sp | 12.2 | 8.2 |
| Microb. flavum var glutamicum ATTC-13693 | 13.8 | 9.8 |
| Arthrobacter globiformis | 17.9 | 11.2 |
| Arthro. simplex | 13.6 | 9.8 |
| Arthro. pascens | 11.4 | 7.2 |
| Arthro. oxydans | 12.4 | 10.2 |

We claim:

1. A process for producing L-isoleucine which comprises cultivating at least one of the prototrophs of glutamic acid-producing bacteria having no requirement for nutrients other than vitamins, said prototrophs being selected from the group consisting of *Brevibacterium divaricatum*, *Brevibacterium pentoso-amino-acidicum*, *Brevibacterium niigata*, *Corynebacterium lilium*, *Corynebacterium callunae*, *Microbacterium flavum* var *glutamicum*, *Microbacterium salicinovorum* nov. sp., *Arthrobacter globiformis*, *Arthrobacter simplex* and *Arthrobacter oxydans*, under an aerobic condition in a medium containing a carbon source, a nitrogen source, inorganic salts, biotin and DL-alpha-amino-n-butyric acid, and thereafter collecting the L-isoleucine produced.

2. The process according to claim 1 wherein said culture is effected under the conditions of an incubation temperature of 25–35° C., a culture pH of 6–9.0 and a culture period of 30–96 hours.

3. The process according to claim 1 wherein said medium contains per one liter thereof 4–5 gammas of biotin and 5–30 grams of alpha-aminobutyric acid.

4. The process according to claim 1 wherein said carbon source is a monosaccharide and said nitrogen source is a member selected from the group consisting of urea and combinations of urea with other nitrogen sources, the contents of said monosaccharide, urea and DL-alpha-n-butyric acid per 100 cc. of said medium being respectively 5–15 grams, 0.5–5 grams and 0.5–3 grams.

5. The process according to claim 1 wherein said inorganic salt is a member selected from the group consisting of potassium hydrogen phosphate, magnesium sulfate, ferrous sulfate, manganese sulfate, copper sulfate and sodium molybdate.

6. The process according to claim 5 wherein said inorganic salt is a combination in the medium, said combination consisting of 2–6 p.p.m. of copper sulfate, 5–20 p.p.m. of ferrous sulfate, 5–15 p.p.m. of manganese sulfate, 500–2000 p.pm of potassium phosphate and 200–500 p.p.m. of magnesium sulfate.

References Cited

UNITED STATES PATENTS 3,231,478  1/1966  Uemura et al. _____ 195—29
3,262,861  7/1966  Kinoshita et al. _____ 195—29

LIONEL M. SHAPIRO, Primary Examiner